US009030308B1

(12) United States Patent
Buuck et al.

(10) Patent No.: US 9,030,308 B1
(45) Date of Patent: May 12, 2015

(54) PIEZOELECTRIC HAPTIC ACTUATOR INTEGRATION

(75) Inventors: David C. Buuck, Santa Clara, CA (US); Joseph J. Hebenstreit, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 850 days.

(21) Appl. No.: 12/829,916

(22) Filed: Jul. 2, 2010

(51) Int. Cl.
*G08B 6/00* (2006.01)
*G06F 3/01* (2006.01)
*G09B 21/00* (2006.01)

(52) U.S. Cl.
CPC .............. *G06F 3/016* (2013.01); *G09B 21/003* (2013.01)

(58) Field of Classification Search
CPC ........................................................ G06F 3/017
USPC .............. 340/407.1, 407.2; 345/173, 168, 22; 341/27
See application file for complete search history.

(56) References Cited

U.S. PATENT DOCUMENTS

| | | | | |
|---|---|---|---|---|
| 5,416,494 A * | 5/1995 | Yokota et al. | .................... | 345/79 |
| 6,118,435 A * | 9/2000 | Fujita et al. | .................... | 345/173 |
| 6,586,889 B1 * | 7/2003 | Yaniv et al. | ................. | 315/169.3 |
| 6,661,563 B2 * | 12/2003 | Hayashi et al. | ................ | 359/296 |
| 7,167,168 B2 * | 1/2007 | Nose et al. | .................... | 345/204 |
| 7,176,903 B2 * | 2/2007 | Katsuki et al. | ................ | 345/173 |
| 7,215,329 B2 * | 5/2007 | Yoshikawa et al. | ........... | 345/173 |
| 7,227,537 B2 * | 6/2007 | Nakayama et al. | ........... | 345/173 |
| 7,656,675 B2 * | 2/2010 | Kim et al. | .................... | 361/752 |
| 7,714,845 B2 * | 5/2010 | Matsumoto et al. | .......... | 345/173 |
| 7,999,660 B2 * | 8/2011 | Cybart et al. | ............... | 340/407.2 |
| 8,077,162 B2 * | 12/2011 | Endo | .............................. | 345/177 |
| 8,144,133 B2 * | 3/2012 | Wang et al. | ................... | 345/174 |
| 8,154,527 B2 * | 4/2012 | Ciesla et al. | .................. | 345/173 |
| 8,177,942 B2 * | 5/2012 | Paolini et al. | ............ | 204/157.15 |
| 8,279,193 B1 * | 10/2012 | Birnbaum et al. | ............ | 345/173 |
| 8,279,623 B2 * | 10/2012 | Idzik et al. | .................... | 361/814 |
| 8,310,457 B2 * | 11/2012 | Faubert et al. | ................ | 345/173 |
| 8,330,590 B2 * | 12/2012 | Poupyrev et al. | .......... | 340/407.2 |
| 8,334,835 B2 * | 12/2012 | Shen et al. | ..................... | 345/104 |
| 8,339,250 B2 * | 12/2012 | Je et al. | ..................... | 340/407.2 |
| 8,345,013 B2 * | 1/2013 | Heubel et al. | ................. | 345/173 |
| 8,369,887 B2 * | 2/2013 | Choe et al. | ................. | 455/550.1 |
| 8,384,679 B2 * | 2/2013 | Paleczny et al. | ............. | 345/173 |
| 8,421,610 B2 * | 4/2013 | Ahn et al. | ................... | 340/407.2 |
| 8,704,780 B2 * | 4/2014 | Son et al. | ....................... | 345/173 |
| 2002/0025837 A1 * | 2/2002 | Levy | .............................. | 455/566 |
| 2002/0084721 A1 * | 7/2002 | Walczak | ....................... | 310/339 |
| 2003/0067448 A1 * | 4/2003 | Park | ............................... | 345/173 |
| 2006/0049920 A1 * | 3/2006 | Sadler et al. | ................ | 340/407.1 |
| 2006/0181522 A1 * | 8/2006 | Nishimura et al. | ........... | 345/177 |
| 2006/0192657 A1 * | 8/2006 | Nishimura et al. | ........ | 340/407.2 |
| 2008/0204417 A1 * | 8/2008 | Pierce et al. | .................... | 345/168 |
| 2008/0218488 A1 * | 9/2008 | Yang et al. | ..................... | 345/173 |
| 2009/0002140 A1 * | 1/2009 | Higa | .......................... | 340/407.1 |
| 2009/0121848 A1 * | 5/2009 | Yuk et al. | ................... | 340/407.2 |
| 2009/0128503 A1 * | 5/2009 | Grant et al. | ..................... | 345/173 |

(Continued)

*Primary Examiner* — Jennifer Mehmood
*Assistant Examiner* — Rufus Point
(74) *Attorney, Agent, or Firm* — Lee & Hayes, PLLC

(57) ABSTRACT

User interface experiences with electronic devices are enhanced with feedback cues such as haptic or vibrotactile output feedback. One or more piezoelectric actuators generate haptic output. The one or more piezoelectric actuators may be integrated onto a display substrate, a battery case, a device enclosure, or other component. Such integration may improve propagation of the haptic output to the user, reduce bulk of the electronic device, minimize parts count, and reduce production costs.

24 Claims, 10 Drawing Sheets

(56) References Cited

U.S. PATENT DOCUMENTS

| | | |
|---|---|---|
| 2009/0250267 A1* | 10/2009 | Heubel et al. ............... 178/18.03 |
| 2010/0090813 A1* | 4/2010 | Je et al. ....................... 340/407.2 |
| 2010/0156818 A1* | 6/2010 | Burrough et al. ............. 345/173 |
| 2010/0156823 A1* | 6/2010 | Paleczny et al. ............. 345/173 |
| 2010/0160016 A1* | 6/2010 | Shimabukuro et al. ......... 463/16 |
| 2010/0225600 A1* | 9/2010 | Dai et al. ...................... 345/173 |
| 2010/0231540 A1* | 9/2010 | Cruz-Hernandez et al. .. 345/173 |
| 2010/0231541 A1* | 9/2010 | Cruz-Hernandez et al. .. 345/173 |
| 2010/0250071 A1* | 9/2010 | Pala et al. ....................... 701/48 |
| 2010/0259368 A1* | 10/2010 | Fahn .......................... 340/384.1 |
| 2010/0277439 A1* | 11/2010 | Charlier et al. ............... 345/176 |
| 2011/0025609 A1* | 2/2011 | Modarres et al. ............. 345/173 |
| 2011/0261021 A1* | 10/2011 | Modarres et al. ............. 345/177 |

\* cited by examiner

PIEZOELECTRIC HAPTIC ACTUATOR INTEGRATION

BACKGROUND

User interfaces for electronic devices traditionally engage a limited number of human senses. Users see images presented on displays, and hear sounds generated by speakers, but physical feedback has been limited to simple shakes or buzzes. Furthermore, in addition to having limited output capabilities, traditional mechanisms are bulky, rendering them difficult to incorporate into small form-factor devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIGS. 3A and 3B depict cross sections of an integrated haptic stack with a piezoelectric haptic actuator on a display substrate.

DETAILED DESCRIPTION

Overview

Figure 1:
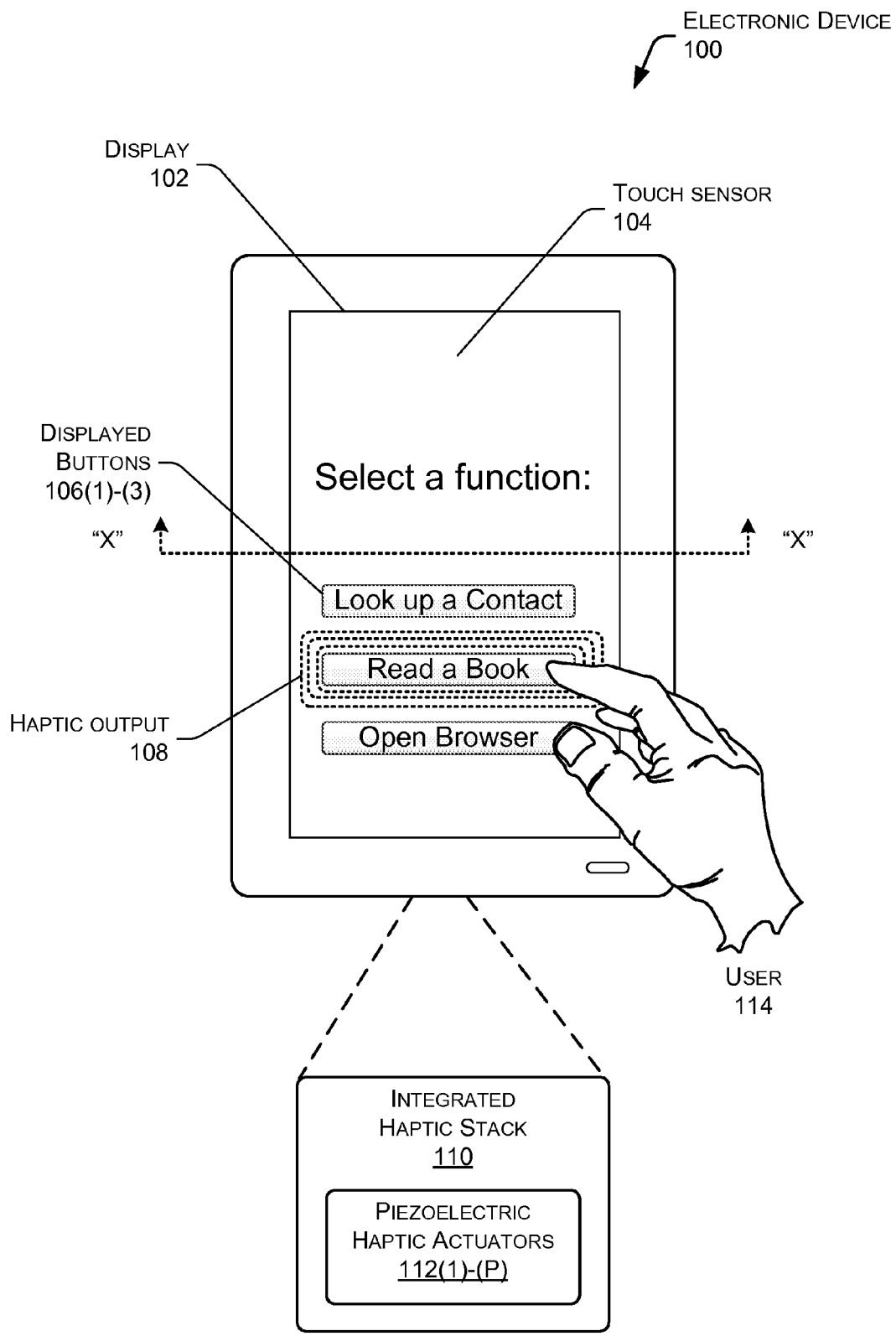
FIG. 1 depicts an electronic device having a display, a touch sensor, and an integrated haptic stack.

Electronic devices such as cellular phones, portable media players, tablet computers, netbooks, laptops, personal computers, cash registers, electronic book ("eBook") readers, input devices, and so forth, incorporate user interfaces to allow users to interact with them. Further, engaging various senses of the user tends to provide a more interactive and satisfying experience for the user. For instance, display screens provide visual output while speakers provide audio output. However, haptic (or "vibrotactile") output has been limited. Traditional haptic output components provide coarse haptic output such as buzzes or vibrations. For example, a typical haptic output component may consist of a vibrator with a rotary motor coupled to an eccentric weight that, when spun, generates a vibration.

The following discussion, meanwhile, describes piezoelectric haptic actuators and techniques to use these piezoelectric haptic actuators to generate haptic output. Audio output devices, such as speakers, are configured to compressively modulate an ambient fluid such as air or water. While a speaker generating a high amplitude audio output may impart some vibration on a speaker enclosure, the purpose of the speaker is to produce audible output rather than move or deform the speaker enclosure. In contrast, the haptic output devices described are designed to impart a physical dislocation of and/or transfer of momentum to a solid or semi-solid structure.

As discussed herein, the piezoelectric haptic actuators are configured to generate a physical force and impart a transfer of momentum between at least two components of a device or a dislocation or deformation of a portion of the device. For example, in one implementation where momentum transfer is used, when the user is touching the device the user feels the transfer of momentum as the haptic output. In another implementation where dislocation or deformation is used, the user may feel the actual dislocation or deformation, such as a bump or ridge on the display.

The following discussion also describes techniques for incorporating these actuators into integrated haptic stacks. In some implementations, the piezoelectric haptic actuators share a substrate with another component. For example, the piezoelectric haptic actuator may be disposed on one side of an existing substrate, such as a non-display side of a display substrate, a portion of a battery casing, a device enclosure, and so forth. Once assembled, this arrangement comprises an integrated haptic stack. Such integration reduces bulk, minimizes parts count, and may also reduce production costs.

In other implementations, the piezoelectric haptic actuator may be disposed upon a haptic substrate, and placed adjacent to or between other components. Such emplacement results in a variation of the integrated haptic stack.

Piezoelectric materials expand, contract, or both upon the application of an electric field. For example, but not by way of limitation, piezoelectric materials include various crystals such as quartz, ceramics such as lead zirconate titanate, and polymers such as polyvinylidene fluoride and ionic polymer-metal composites. Applying an electric field to the piezoelectric material results in an alteration of the shape of the material and generation of a physical force. The resulting physical force produces haptic output, suitable for user feedback.

This haptic output may enhance a user interface of an electronic device by enhancing a user's experience with the device. For example, consider a user interacting with a touch sensitive display, or touchscreen, on an electronic device. Without haptic output, the user's selection of an object such as a virtual button on the screen via touch is limited to visual cues, such as changing the color of the selected object, and/or auditory cues, such as playing a sound. With haptic output, such as generated via the piezoelectric haptic actuators described below, the user may experience a variety of tactile effects. For example, the user may be able to actually feel in their fingertips what seems to resemble edges of the button on the display screen. Likewise, the user placing additional pressure on the object may result in haptic output resembling the physical depress and click of a mechanical button, reaffirming the user's selection of that button.

In the implementations described in detail below, an electronic device may integrate one or more piezoelectric actuators in one of several configurations. In one configuration, the piezoelectric actuators are affixed to a substrate that also serves as a substrate for other components of the device to form an integrated haptic stack. In this configuration, the substrate performs an additional function, such as acting as a substrate for a display, casing for a battery, portion of the enclosure containing the electronic device, and so forth. In another configuration the piezoelectric actuators are affixed to a dedicated haptic substrate to form a haptic assembly. The haptic assembly may then be incorporated with other components such as the display, battery, and so forth to form the integrated haptic stack.

Regardless of whether or not the substrate is shared with another component of the device, the piezoelectric haptic actuators may reside on the substrate in a variety of arrangements. The count, distribution, and geometry of the actuators may be adjusted to account for variations in compliance of the substrate, desired output characteristics, and so forth. The count of piezoelectric haptic actuators may vary from a single element to an array on the substrate. Actuators may be distributed on the substrate as a regular matrix or in various positions. Each of the piezoelectric haptic actuators may manifest in one of many possible geometries. For example, actuators may be circular, elliptical, polygonal, and so forth on the substrate.

Each of the piezoelectric haptic actuators couple via electrical conductors, such as wires or circuit traces, to a haptic controller. The haptic controller is configured to output the electrical signals that generate the piezoelectric effect within the piezoelectric material, thus producing a haptic output. In some implementations the piezoelectric haptic actuators may be independently addressable by the haptic controller, such that one or more specified actuators generate output while other non-specified actuators remain inactive.

Illustrative Touch-Screen Device

FIG. 1 depicts an illustrative electronic device 100 having a display, a touch sensor, and an integrated haptic stack with a user interface presenting several controls on the display. Electronic devices 100 include electronic book readers, cellular phones, portable media players, cash registers, personal computers, tablet computers, netbooks, laptops, desktops, kiosks, and so forth.

The electronic device 100 includes a display 102, described in more depth below with regards to FIG. 2, configured to present information to a user. Approximately perpendicular to the long axis of the display is cross sectional line "X," with cross sections discussed below with regards to FIGS. 3-4.

As illustrated, the electronic device 100 includes a touch sensor 104 for receiving user input. This touch sensor 104 may be adjacent to or integrated with the display 102 to form a touchscreen. For descriptive purposes, three controls in the form of virtual buttons 106(1)-(3) are presented on the display 102 that, when activated, allow the user to lookup a contact, read a book, or open a browser. Haptic output 108 is designated with broken lines, and is generated by an integrated haptic stack 110. The integrated haptic stack 110 incorporates one or more piezoelectric haptic actuators 112(1)-(P) that are configured to generate a haptic, or vibrotactile, output which may be felt by a user 114. The haptic output 108, for example, may simulate the tactile experience of the user pushing the button 106 to "read a book" as if the button was an actual mechanical button.

The integrated haptic stack 110 incorporates the piezoelectric haptic actuators 112(1)-(P) on a substrate, which may or may not be shared with another component of the device, such as the display 102. Such incorporation may improve propagation of the haptic output 108 to the user 114, reduce bulk of the electronic device 100, minimize parts count, reduce production costs, and so forth. The integrated haptic stack 110 is described in more depth below with regards to FIGS. 3-4.

Figure 2:
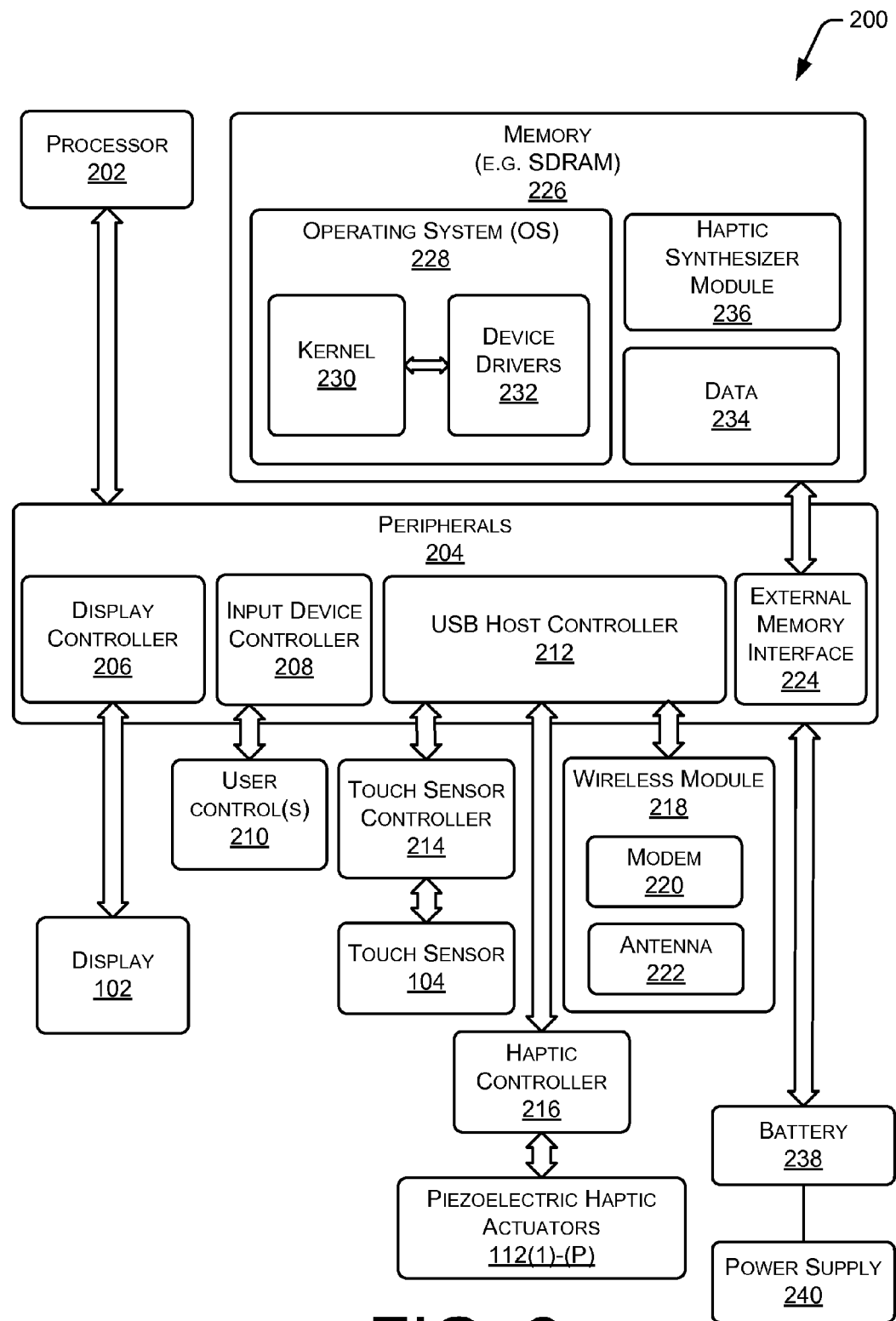
FIG. 2 is a block diagram of example internal components of an illustrative electronic device, such as the device of FIG. 1.

FIG. 2 is a block diagram 200 of example internal components of the illustrative electronic device 100. In a very basic configuration, the device 100 includes or accesses components such as a processor 202 and one or more peripherals 204. Each processor 202 may itself comprise one or more processors.

Peripherals 204 couple to the processor 202. A display controller 206 is shown coupled to one or more displays 102. These displays may comprise drive electronics, such as a display drive matrix configured to affect individual pixels within the display 102. In some implementations, multiple displays may be present and may couple to the display controller 206. These multiple displays may be located in the same or different enclosures or panels. Furthermore, one or more display controllers 206 may couple to the multiple displays.

The display 102 may present content in a human-readable format to a user. The display 102 may comprise electrophoretic, interferometric, cholesteric, or other stable display technology which retains an image with no or little power applied to the display drive matrix. In other implementations, an active display such as a liquid crystal display, plasma display, light emitting diode display, and so forth may be used.

When multiple displays are present, these displays may be of the same or different types. For example, one display may be an electrophoretic display while another may be a light emitting diode display.

For convenience only, the display 102 is shown in a generally rectangular configuration. However, it is understood that the display 102 may be implemented in any shape, and may have any ratio of height to width. Also, for stylistic or design purposes, the display 102 may be curved or otherwise non-linearly shaped. Furthermore the display 102 may be flexible and configured to fold or roll.

The content presented on the display 102 may take the form of electronic books or "eBooks." For example, the display 102 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The electronic device 100 further includes a touch sensitive input device. In one implementation, the touch sensor 104 may be placed behind the display, such that user input through contact or gesturing relative to the display 102 may be received. In another implementation, the touch sensor 104 may be placed in front of the display 102, or in another part of the device altogether.

The electronic device 100 may have an input device controller 208 configured to accept input from the touch sensor, keypad, keyboard, or other user actuable controls 210. These user actuable controls 210 may have dedicated or assigned operations. For instance, the actuatable controls 112 may include page turning buttons, a joystick, navigational keys, a power on/off button, selection keys, joystick, and so on.

The peripherals 204 may include a USB host controller 212. The USB host controller 212 manages communications between devices attached to a universal serial bus ("USB") and the processor 202 and other peripherals.

FIG. 2 further illustrates that the electronic device 100 includes a touch sensor controller 214. The touch sensor controller 214 may couple to the processor 202 via the USB host controller 212 (as shown). In other implementations the touch sensor controller 214 may couple to the processor via the input device control 208, inter-integrated circuit ("I²C"), universal asynchronous receiver/transmitter ("UART"), serial peripheral interface bus ("SPI"), or other interface. The touch sensor controller 214 also couples to the touch sensor 104.

The touch sensor controller 214 is configured to accept input from the touch sensor 104 to determine characteristics of interaction with the touch sensor. These characteristics may include the location of one or more touches on the touch sensor 104, magnitude of the force, shape of the touch, and so forth.

A haptic controller 216 may couple to the USB host controller 212. In another implementation, the haptic controller 216 may couple to another interface within the electronic device 100. The haptic controller 216 couples to the piezoelectric haptic actuators 112(1)-(P). As described above, the piezoelectric haptic actuators 112(1)-(P) provide haptic output to the user 114.

The USB host controller 212 may also couple to a wireless module 218 via the universal serial bus. The wireless module 218 may allow for connection to wireless local or wireless wide area networks ("WWAN"). The wireless module 218 may include a modem 220 configured to send and receive data wirelessly and one or more antennas 222 suitable for propagating a wireless signal. In other implementations, a wired network interface may be provided.

The electronic device 100 may also include an external memory interface ("EMI") 224 coupled to external memory 226. The EMI 224 manages access to data stored in the external memory 226. The external memory 226 may comprise Static Random Access Memory ("SRAM"), Pseudo-static Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

The external memory 226 may store an operating system 228 comprising a kernel 230 operatively coupled to one or more device drivers 232. The device drivers 232 also operatively couple to the peripherals 204. The external memory 226 may also store data 234, which may comprise content for consumption on the electronic device 100, executable programs, databases, user settings, configuration files, device status, and so forth. As shown, the external memory 226 may store a haptic synthesizer module 236 configured to generate commands for the haptic controller 216, which in turn generates haptic output 108 via the piezoelectric haptic actuators 112(1)-(P).

The electronic device 100 may include one or more other, non-illustrated peripherals, such as a hard drive using magnetic, optical, or solid state storage to store information, a firewire bus, a Bluetooth™ wireless network interface, camera, global positioning system, PC Card component, sound interface, and so forth.

One or more batteries 238 may provide operational electrical power to components of the electronic device 100 for operation when the device is disconnected from a power supply 240. Operational electrical power is sufficient to provide for operation of the device, as distinguished from the lesser electrical power requirements of a sleep or state retention mode. The power supply 240 may be internal or external to the electronic device 100. The power supply 240 is configured to provide operational power for electronic device 100, charge the battery 238, or both. "Battery" as used in this application includes components capable of acting as a power source to an electronic device. Power sources include chemical storage cells such as lithium polymer batteries, charge storage devices such as ultracapacitors, fuel cells, and so forth.

Couplings, such as that between haptic controller 216 and the USB host controller 212, are shown for emphasis. There are couplings between many of the components illustrated in FIG. 2, but graphical arrows are omitted for clarity of illustration.

FIG. 3A depicts an enlarged cross section 300 of one implementation of the electronic device of FIG. 1 along line "X". The display 102 comprises one or more presentation layers 302 and a display substrate 304. As described above, the display 102 may incorporate a touch sensor 104 above or below the display. For clarity of illustration, but not as a limitation, the touch sensor 104 is omitted.

The presentation layers 302 generate the image a user sees and may comprise an electrophoretic slurry, liquid crystals, light emitting diodes, and so forth. The display substrate 304 may comprise an active display drive matrix used in conjunction with the presentation layers 302 to generate an image for presentation the user.

The display substrate 304 comprises two sides, which are opposite one another and substantially parallel to one another. A first side is adjacent to the presentation layers 302, while the second side is on the side opposite. In traditional assemblies, this second side is unused. As shown here, however, a piezoelectric haptic actuator 112 affixes to the second side of the display substrate 304. In some implementations, the second side may comprise a conductor to provide an electrical path to the piezoelectric haptic actuators 112(1)-(P).

Figure 3B:
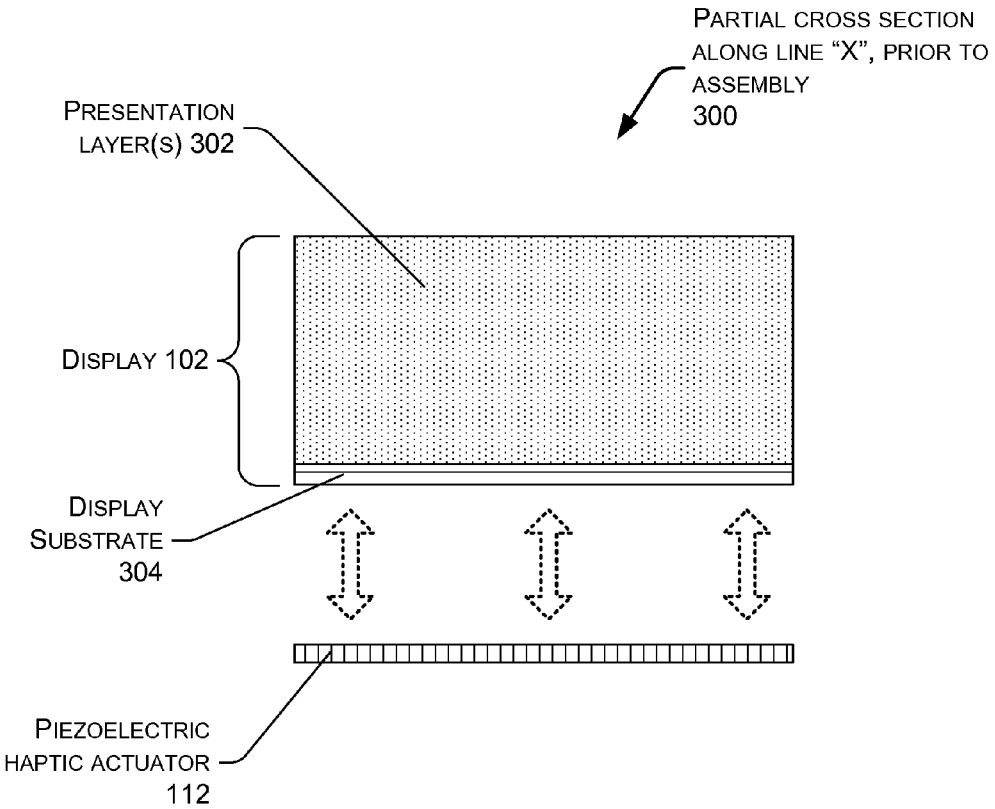
Figure 3B:
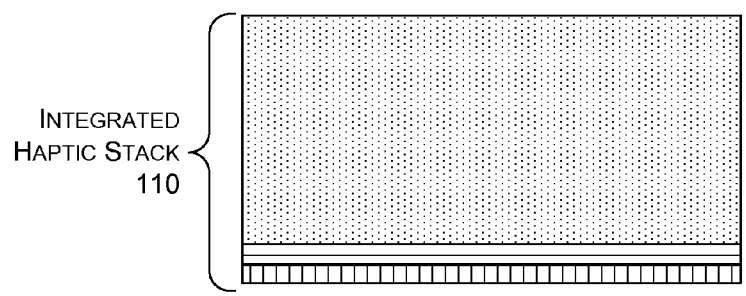

The affixing of the piezoelectric haptic actuator 112 to the second side of the display substrate 304 may involve lamination, application of heat, direct deposition, and so forth. Thus, the piezoelectric haptic actuator 112 becomes a part of the display substrate 304. FIG. 3B shows the cross section 306 of the integrated haptic stack 110. The assembled stack provides a low profile, small form factor device while reducing part count. Additionally, the placement of the piezoelectric haptic actuators 112(1)-(P) on the display substrate 304 provides a mechanical path suitable for the propagation of physical forces to the user via the display 102. Thus, a user touching the display 102 may also feel the generated haptic output 108.

While the display substrate 304 is depicted here, in other implementations portions of other components may be used as a substrate for the piezoelectric haptic actuators 112(1)-(P). For example, a battery casing, a portion of a device enclosure, and so forth may serve as a substrate for the piezoelectric haptic actuators 112(1)-(P).

Figure 4A:
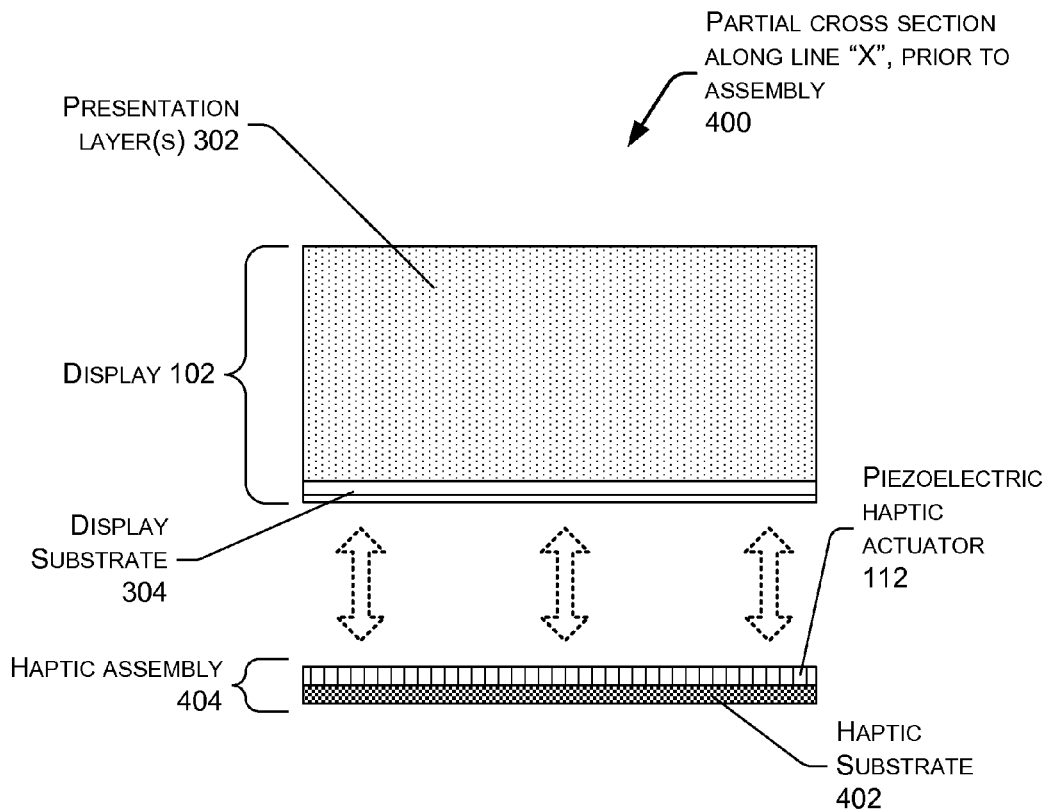
FIGS. 4A and 4B illustrate cross sections of an integrated haptic stack with a piezoelectric haptic actuator on a haptic substrate.

FIG. 4A illustrates a cross section 400 of an alternative implementation of an integrated haptic stack. In this implementation, the piezoelectric haptic actuator 112 is affixed to a haptic substrate 402 to form a haptic assembly 404. In one implementation, the haptic substrate comprises a foil or thin film of stainless steel or another conductive material. The piezoelectric haptic actuator 112 may be affixed, bonded, laminated, fired, deposited, and so forth onto the haptic substrate 402. In some implementations, a perimeter of the haptic substrate 402 may be disposed to correspond to a perimeter of the display 102.

In some implementations, piezoelectric haptic actuators 112 may be disposed on both sides of the haptic substrate 402. Such an arrangement increases a stroke length and force output of the haptic assembly 404 when the piezoelectric haptic actuators 112 are active.

Figure 4B:
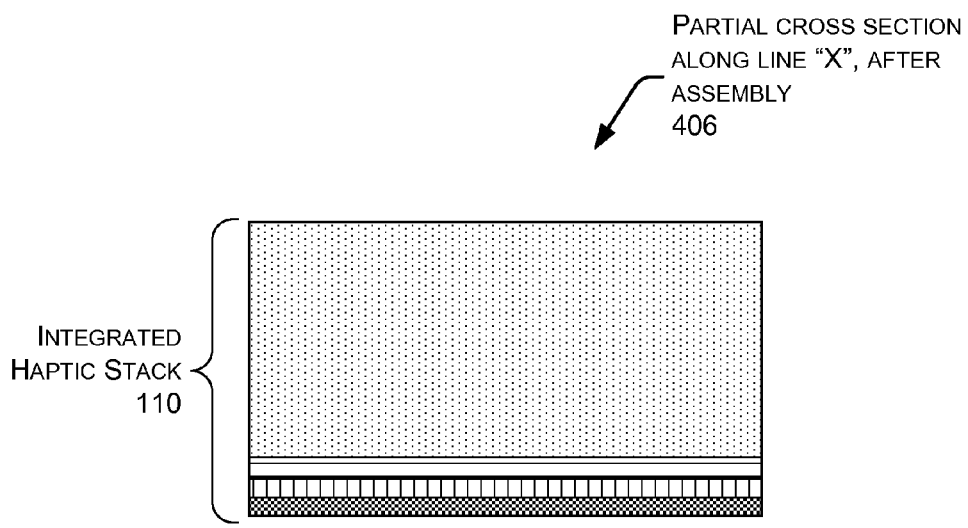

FIG. 4B depicts the cross section 406 after assembly depicting the integrated haptic stack 110. As above, this integration allows for a mechanical path suitable for the propagation of physical forces from the piezoelectric haptic actuators 112 to the user via the display 102. Other advantages include a low profile and ease of construction and variability between models. For example, the haptic assembly 404 may be optional on some models of the electronic device 100. Due to the small form factor and ease of insertion during assembly, the haptic assembly 404 may be included or omitted depending upon the desired option.

Figure 5:
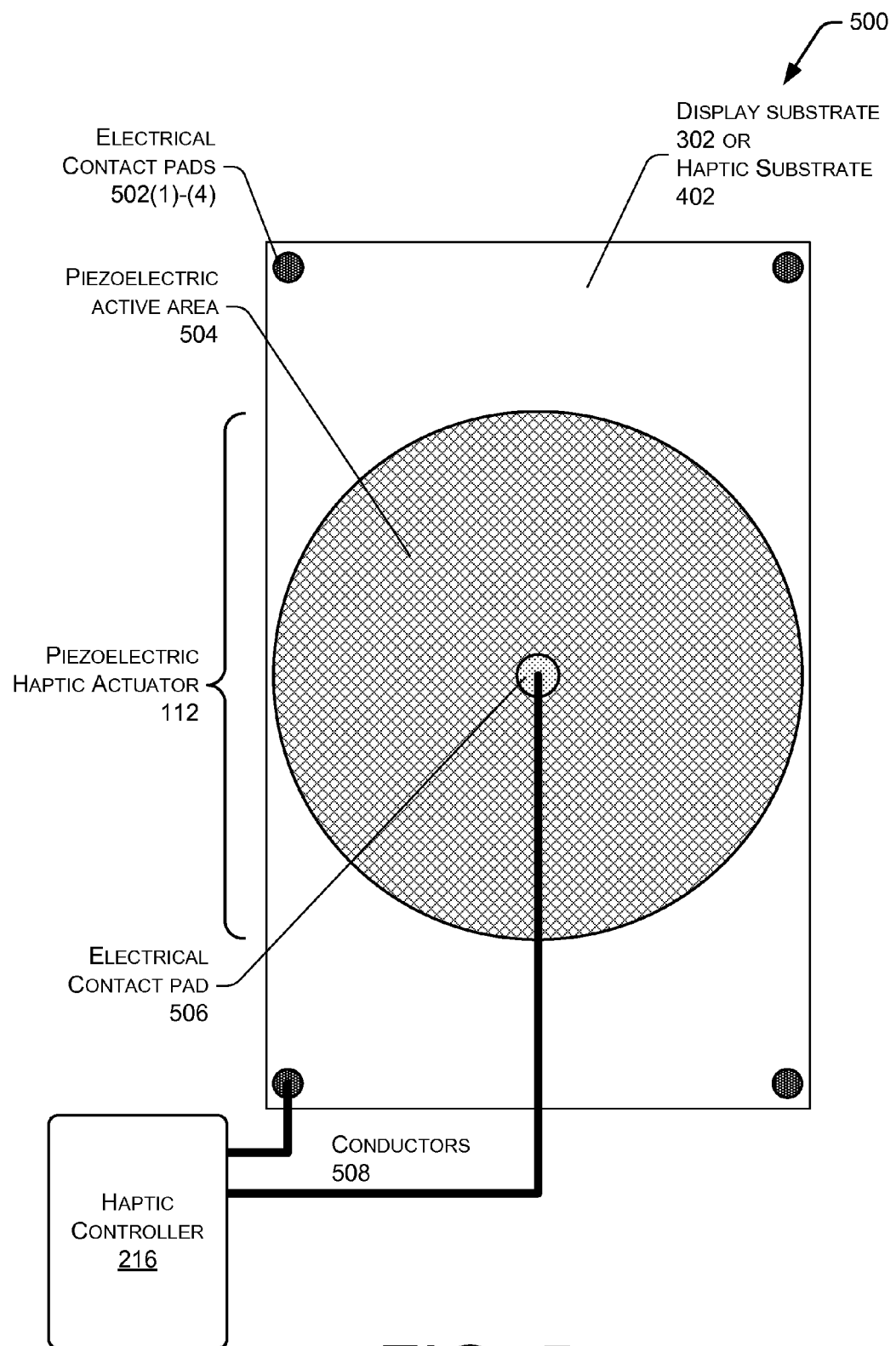
FIG. 5 depicts a plan view of a single piezoelectric haptic actuator on a substrate.

FIG. 5 illustrates a plan view 500 of a single piezoelectric haptic actuator on a substrate. As described above, the substrate may comprise the display substrate 302, another substrate shared with another component, such as an enclosure or battery casing, or the haptic substrate 402.

In this illustration a single circular geometry piezoelectric haptic actuator 112 is depicted, disposed approximately in the center of the substrate. In some implementations, the positioning of the piezoelectric haptic actuator 112 may be varied depending upon the mechanical characteristics of adjacent structures. For example, the piezoelectric haptic actuator 112 may be disposed on the substrate closest to an internal support member to provide a better path for propagation of the haptic output 108.

The substrate may comprise a conductive surface, having one or more electrically conductive contact pads 502. In this example, four contact pads 502(1)-(4) are depicted at four corners of the substrate. In other implementations, the number of contact pads 502(1)-(X) and/or position may vary. In other implementations, the substrate may be non-conductive, and a conductive layer may be incorporated into the piezoelectric haptic actuator 112.

FIG. 5 also illustrates that the piezoelectric haptic actuator 112 includes a piezoelectric active area 504. This area contains the piezoelectric material used to generate the force output. An electrical contact pad 506 resides within or in contact with the piezoelectric active area 504. While this figure illustrates a single electrical contact pad 506, in some implementations multiple electrical contact pads 506 may be present within or in contact with the piezoelectric active area 504. Additionally, in some implementations the contacts 506, 502, or both may be distributed along the sides or edges.

A combination of the electrical contact pad 502 and the electrical contact pad 506 are used to deliver electrical signals to the piezoelectric active area 504. These electrical signals in turn generate the physical displacement of the piezoelectric material which in turn results in a transfer of momentum, deformation, dislocation, or a combination thereof which is perceived by the user as the haptic output 108.

The haptic controller 216 as described above generates the electrical signals themselves. These signals may vary in polarity, voltage, waveform, and so forth. Conductors 508 convey the electrical signals to the electrical contact pads 502 and 506. These conductors may comprise wires, circuit traces, and so forth.

Figure 6:
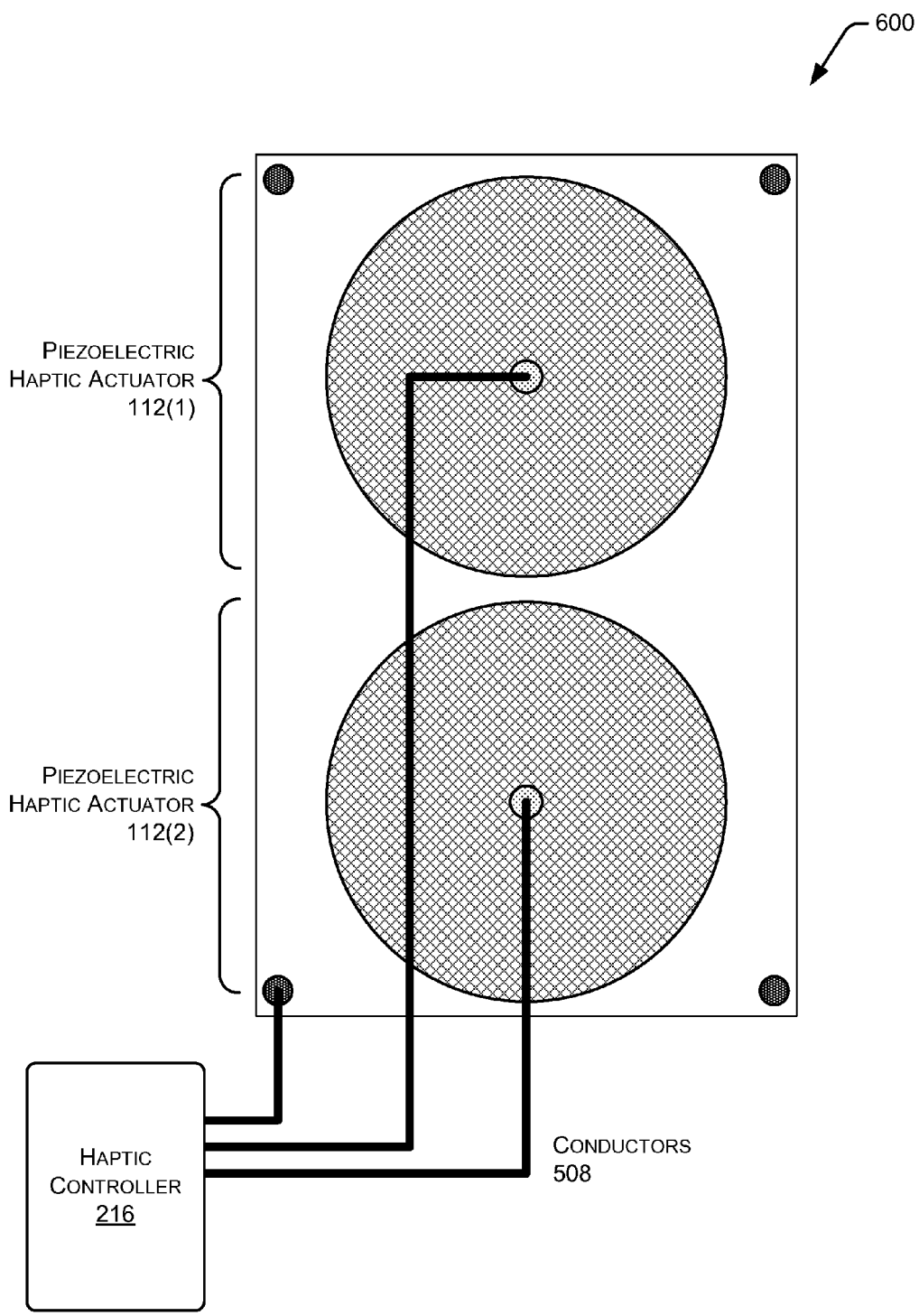
FIG. 6 depicts a plan view of dual piezoelectric haptic actuators on a substrate.

FIG. 6 illustrates a plan view 600 of dual piezoelectric haptic actuators on a substrate. As described above, multiple piezoelectric haptic actuators 112 may be used to generate haptic output 108. In this illustration, two circular geometry piezoelectric haptic actuators 112(1)-(2) are presented. As described above, they are coupled via the conductors 508 to the haptic controller 216.

Figure 7:
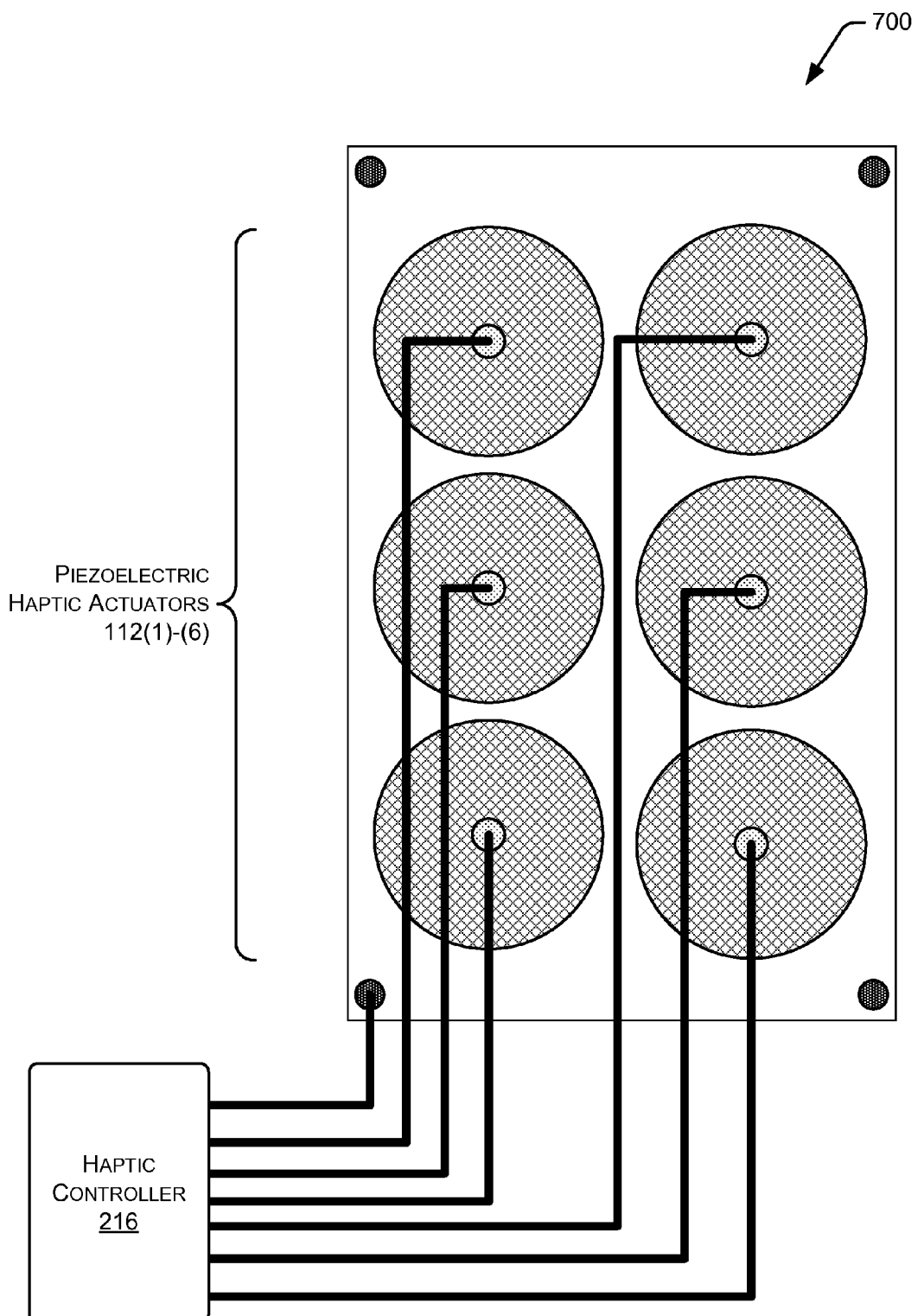
FIG. 7 depicts a plan view of six piezoelectric haptic actuators on a substrate.

FIG. 7 illustrates a plan view 700 of six piezoelectric haptic actuators on a substrate. In this illustration, the piezoelectric haptic actuators are distributed in a regular array or matrix on the surface of the substrate. In other implementations the distribution may differ. In some implementations the haptic controller 216 may independently address one or more of the piezoelectric haptic actuators 112. For example, the haptic controller 216 may generate output from the piezoelectric haptic actuators 112(1), (4), and (5) while the other non-specified actuators 112(2), (3), and (6) remain inactive. Variable addressing may be used to vary the nature and magnitude of the haptic output 108.

Figure 8:
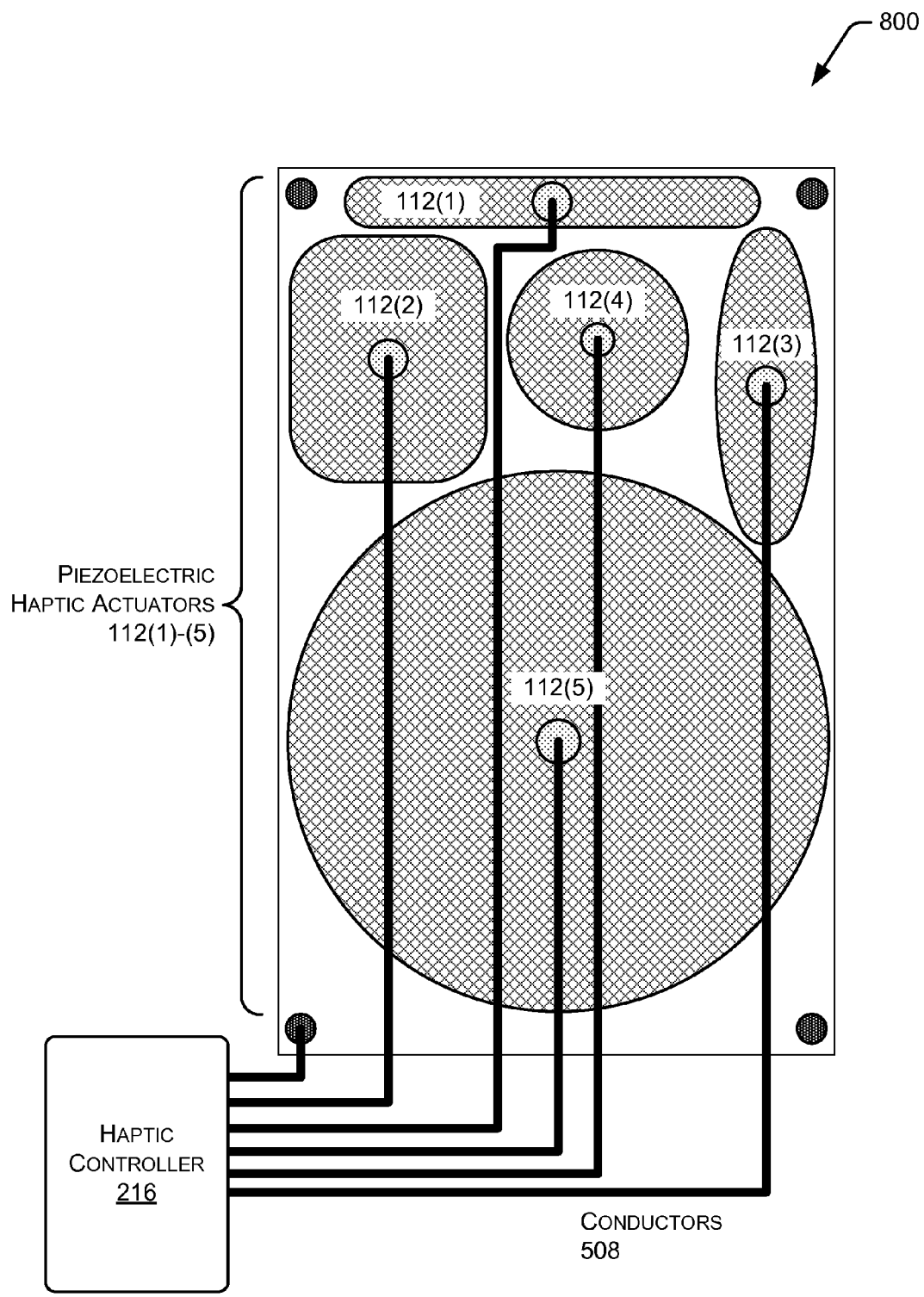
FIG. 8 depicts a plan view of five piezoelectric haptic actuators with different geometries on a substrate.

FIG. 8 illustrates a plan view 800 of five piezoelectric haptic actuators with different geometries on a substrate. The count, distribution, and geometry of the actuators may be adjusted to account for variations in compliance of the substrate, desired output characteristics, and so forth.

The piezoelectric haptic actuators may manifest in one of many possible geometries. The different geometries may be determined according to desired output characteristics, space available on the substrate, or other factors. A selection of possible geometries is depicted. A rectangular piezoelectric haptic actuator 112(1) is shown with rounded corners. Rounded corners as well as generally arcuate forms may reduce localized stresses generated by movement of the piezoelectric material. By reducing localized stresses, longevity of the actuator 112 is improved.

An elliptical piezoelectric haptic actuator 112(3) is depicted, as well as a pair of circular piezoelectric haptic actuators 112(4) and (5) of differing sizes. Specific ratios of actuator sizes may be used to produce a range of desired outputs. For example, as shown here the large circular piezoelectric haptic actuator 112(5) has a diameter approximately three times that of the small circular piezoelectric haptic actuator 112(4). In other implementations, other geometries may be used.

Figure 9:
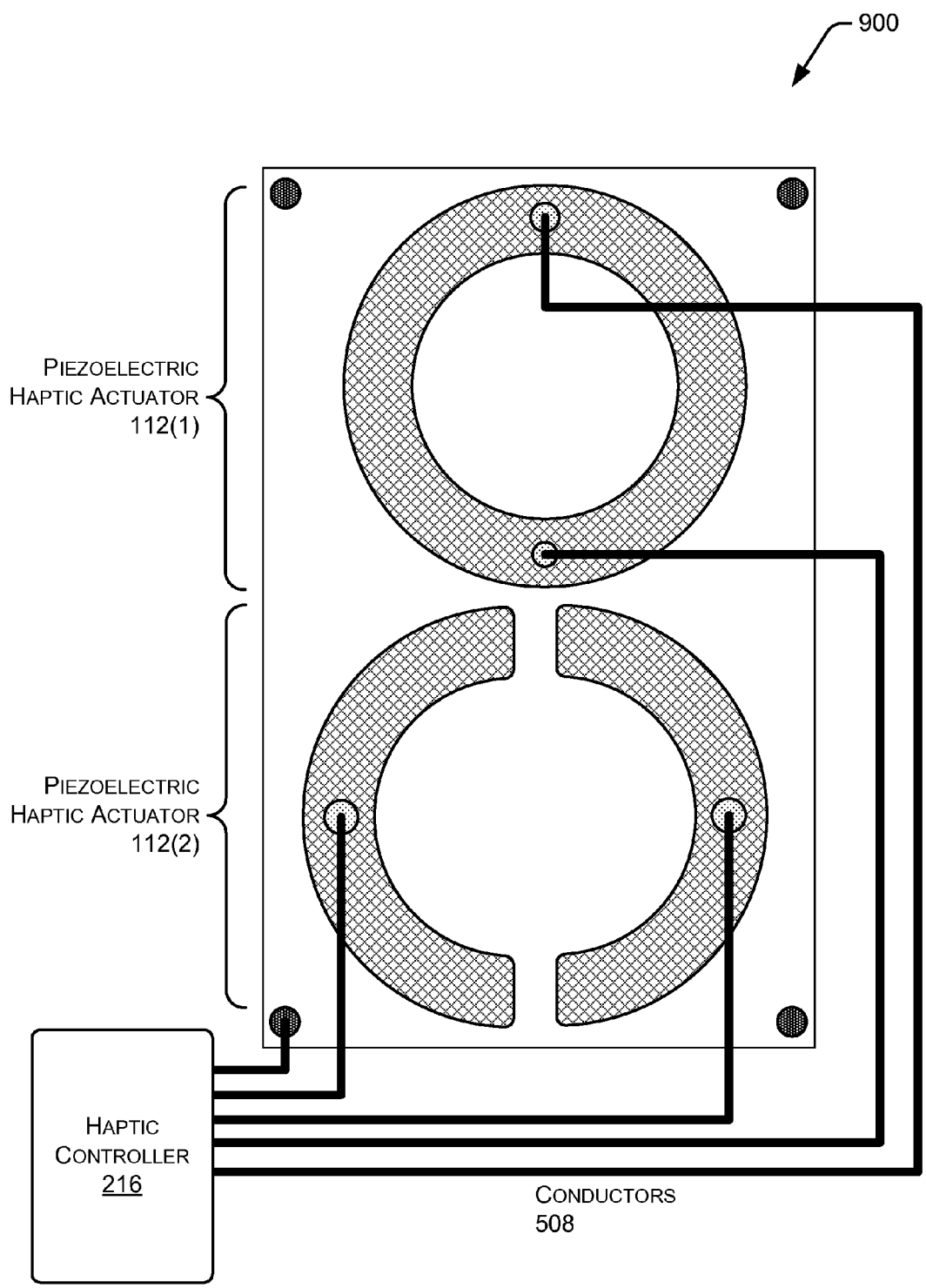
FIG. 9 depicts a plan view of additional geometries of piezoelectric haptic actuators on a substrate.

FIG. 9 depicts a plan view 900 of additional geometries of piezoelectric haptic actuators on a substrate. In some implementations the piezoelectric haptic actuators 112(1) may describe an approximately toroidal shape, such as depicted in this figure. The toroid may form a complete ring such as shown with regards to piezoelectric haptic actuator 112(1) or be split as shown with regards to the piezoelectric haptic actuator 112(2). In some implementations the split of the ring may be such that the halves are equal, such as shown here, while in other implementations the split may be more or less. Furthermore in some implementations, ring sections may nest within one another on the substrate.

Figure 10:
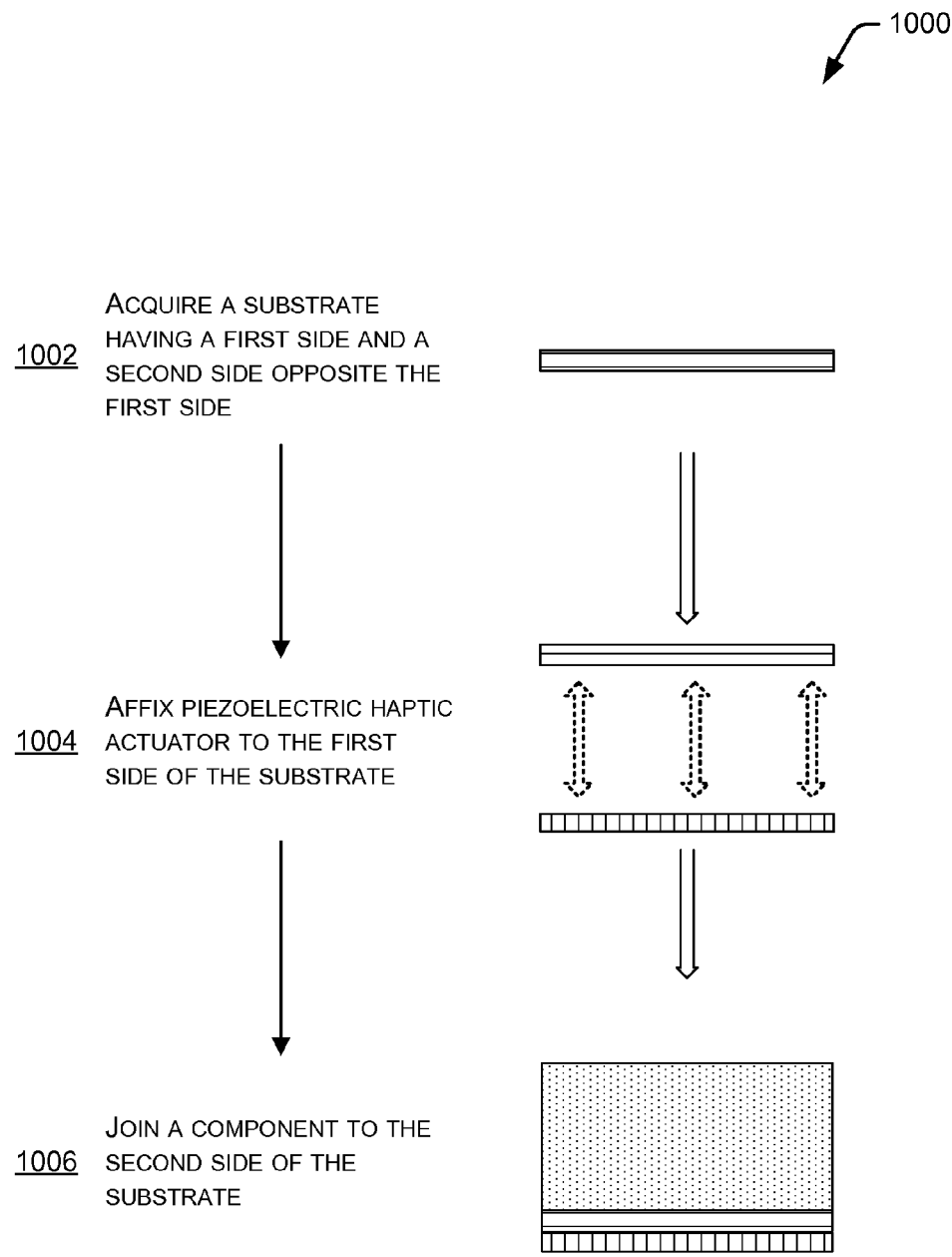
FIG. 10 illustrates a process of forming a haptic stack.

FIG. 10 illustrates an example process 1000 that may be implemented with the architectures of FIGS. 1-9 or by other architectures. This process is illustrated as a collection of blocks in a logical flow graph, which represent a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 10 illustrates a process 1000 of forming an integrated haptic stack with a shared substrate. Operation 1002 depicts acquiring a substrate having a first side and a second side opposite the first side.

Operation 1004 affixes the piezoelectric haptic actuator 112 to the first side. As described above, the affixing may comprise bonding, lamination, firing, depositing, and so forth onto the substrate. In some implementations, the substrate and a component may be joined together as described below before the affixation of the piezoelectric haptic actuators 112.

At 1006 the component is joined to the second side of the substrate. For example, where the substrate comprises the display substrate 304, the presentation layer 302 component may be joined to the second side. Once joined, an integrated haptic stack is formed, incorporating a plurality of functions. Where the component comprises a presentation layer and the resulting substrate and second component produce a display, the two functions of the integrated haptic stack are thus the display function and the haptic output function.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. An electronic device, comprising:
   a processor;
   a display coupled to the processor to render content on the electronic device, the display comprising a display substrate and a presentation layer disposed adjacent to a first side of the display substrate;
   a haptic assembly disposed on a second side of the display substrate substantially opposite the first side of the display substrate, the haptic assembly comprising:
      a haptic substrate; and
      one or more piezoelectric haptic actuators disposed between the haptic substrate and the display substrate on a first side of the haptic substrate; and
   a haptic controller coupled to the processor and configured to drive the one or more piezoelectric haptic actuators.

2. The electronic device of claim 1, wherein the one or more piezoelectric haptic actuators, when driven by the haptic controller, impart a physical force on at least a portion of a structure of the electronic device and generate a resulting transfer of momentum between the structure and a user.

3. The electronic device of claim 1, wherein the one or more piezoelectric haptic actuators, when driven by the haptic controller, impart a physical force on at least a portion of a structure of the electronic device and generate a resulting dislocation or deformation of the structure.

4. The electronic device of claim 1, wherein the one or more piezoelectric haptic actuators, when driven by the haptic controller, simulate a tactile experience.

5. The electronic device of claim 1, wherein the display comprises a touch sensor coupled to the processor and configured to accept user input to manipulate the content rendered by the display.

6. The electronic device of claim 5, wherein the haptic controller is configured to drive the one or more piezoelectric haptic actuators in response to the touch sensor accepting the user input to manipulate the content rendered by the display.

7. The electronic device of claim 5, wherein:
   the user input is received at a particular location of the touch sensor corresponding to a particular location of the display; and
   the haptic controller is configured to drive the one or more piezoelectric haptic actuators at the particular location of the display in response to the touch input.

8. The electronic device of claim 1, wherein the haptic controller is further configured to generate a haptic output via the one or more piezoelectric haptic actuators.

9. The electronic device of claim 1, wherein the presentation layer comprises an electrophoretic slurry.

10. The electronic device of claim 1, wherein the one or more piezoelectric haptic actuators comprises a ceramic material.

11. The electronic device of claim 1, wherein the one or more piezoelectric haptic actuators comprises a polymer material.

12. A haptic output device comprising:
   a plurality of piezoelectric actuators disposed on a first side of a substrate and configured to, when activated, impart a physical force on at least a portion of a structure to generate a haptic output, wherein the plurality of piezoelectric actuators comprises two or more sizes different from one another;
   one or more additional piezoelectric actuators disposed on a second side of the substrate that is substantially opposite the first side, wherein the one or more additional piezoelectric actuators increase at least one of a stroke length and a force output associated with the haptic output when the plurality of piezoelectric actuators disposed on the first side of the substrate are active; and
   a plurality of electrical conductors configured to couple the plurality of piezoelectric actuators and the one or more additional piezoelectric actuators to a haptic controller configured to activate individual piezoelectric actuators.

13. The haptic output device of claim 12, wherein the plurality of piezoelectric actuators disposed on the first side of the substrate comprises two or more geometries different from one another, each geometry associated with a different haptic output characteristic.

14. The haptic output device of claim 12, wherein the plurality of piezoelectric actuators comprises two or more compositions different from one another.

15. A method of assembling an integrated haptic stack for insertion into an electronic device having a structure, the method comprising:
   affixing a haptic assembly to a first side of a display substrate having the first side and a second side opposite the first side, wherein:
      the haptic assembly comprises a haptic substrate and a piezoelectric haptic actuator disposed between the haptic substrate and the display substrate; and
      the piezoelectric haptic actuator is configured to, when active, impart a physical force on at least a portion of the structure of the electronic device to generate a haptic output; and
   joining a component of the electronic device to the second side of the display substrate to form the integrated haptic stack.

16. The method of claim 15, wherein the second side of the display substrate comprises an active display drive matrix and the component of the electronic device comprises an electrophoretic display layer coupled to the active display drive matrix.

17. The method of claim 15, wherein the first side of the display substrate and the second side of the display substrate are substantially planar and parallel to one another.

18. The method of claim 15, wherein the affixing comprises firing the haptic assembly to the first side of the display substrate.

19. The method of claim 15, wherein the joining comprises laminating the component of the electronic device to the second side of the display substrate.

20. The electronic device of claim 1, wherein a perimeter of the haptic substrate is disposed to correspond to a perimeter of the display.

21. The electronic device of claim 1, wherein:
the haptic assembly further comprises one or more additional piezoelectric haptic actuators that are disposed on a second side of the haptic substrate that is substantially opposite the first side of the haptic substrate; and
the one or more additional piezoelectric haptic actuators increase a stroke length and a force output of the haptic assembly when the one or more piezoelectric haptic actuators disposed between the haptic substrate and the display substrate on the first side of the haptic substrate are active.

22. The electronic device of claim 1, wherein the one or more piezoelectric haptic actuators include a plurality of piezoelectric haptic actuators, and at least one of:
the plurality of piezoelectric haptic actuators include two or more sizes different from one another and able to provide different haptic output characteristics; or
the plurality of piezoelectric haptic actuators include two or more geometries different from one another and able to provide different haptic output characteristics.

23. The haptic output device of claim 12, wherein the one or more additional piezoelectric actuators disposed on the second side of the substrate comprises two or more sizes different from one another, each size associated with a different haptic output characteristic.

24. The haptic output device of claim 12, wherein the one or more additional piezoelectric actuators disposed on the second side of the substrate comprises two or more geometries different from one another, each geometry associated with a different haptic output characteristic.

* * * * *